(12) United States Patent
Wierman et al.

(10) Patent No.: US 8,782,031 B2
(45) Date of Patent: Jul. 15, 2014

(54) OPTIMIZING WEB CRAWLING WITH USER HISTORY

(75) Inventors: Dean M. Wierman, Bellevue, WA (US);
Fabrice Canel, Redmond, WA (US);
Balaji Shyamkumar, Sammamish, WA (US); Charles (Xi) Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 13/206,256

(22) Filed: Aug. 9, 2011

(65) Prior Publication Data

US 2013/0041881 A1 Feb. 14, 2013

(51) Int. Cl.
*G06F 17/30* (2006.01)

(52) U.S. Cl.
USPC ............ 707/709; 707/710; 707/713; 707/721

(58) Field of Classification Search
USPC .................................. 707/709, 710, 713, 721
See application file for complete search history.

(56) References Cited

U.S. PATENT DOCUMENTS

| | | | |
|---|---|---|---|
| 7,310,632 B2 | 12/2007 | Meek et al. | |
| 7,599,920 B1 | 10/2009 | Fox et al. | |
| 8,386,459 B1* | 2/2013 | Auerbach et al. | 707/709 |
| 2008/0270484 A1* | 10/2008 | Borkovsky et al. | 707/200 |
| 2009/0248629 A1 | 10/2009 | Marin | |
| 2009/0327913 A1* | 12/2009 | Adar et al. | 715/745 |
| 2010/0241621 A1* | 9/2010 | Randall | 707/709 |
| 2010/0262592 A1 | 10/2010 | Brawer et al. | |
| 2010/0318508 A1 | 12/2010 | Brawer et al. | |
| 2011/0179178 A1* | 7/2011 | Fox et al. | 709/226 |

FOREIGN PATENT DOCUMENTS

| | | |
|---|---|---|
| JP | 2009-048380 | 3/2009 |
| WO | WO 01/50320 | 7/2001 |

OTHER PUBLICATIONS

Teevan et al. "Large Scale analysis of web Revisitation Patterns", copyright 2008, ACM (hereafter Teevan).*
International Search Report and Written Opinion in PCT/US2012/049085, mailed Feb. 1, 2013.
Microsoft TechNet "Determine Crawl Schedules", Published May 12, 2010, 2 pages (Retrieved Apr. 27, 2011), available at: http://technet.microsoft.com/en-us/library/ff383275.aspx.
Dejarnette, Rick, "Crawl Delay and the Bing Crawler, MSNBot", Published Aug. 10, 2009 Bing.com, 1 page, (Retrieved Apr. 27, 2011), available at: http://www.bing.com/community/site_blogs/b/webmaster/archive/2009/08/10/crawl-delay-and-the-bing-crawler-msnbot.aspx.

(Continued)

*Primary Examiner* — Etienne Leroux
*Assistant Examiner* — Cindy Nguyen
(74) *Attorney, Agent, or Firm* — Dave Ream; Brian Haslam; Micky Minhas

(57) ABSTRACT

A politeness manager estimates traffic to the sites based on historical log data generated and sent by plug-ins or toolbars on client web browsers. The historical log data details dates and times the web browsers visit different web sites that is used to understand what timeframes specific web sites are busy and what timeframes the web sites are not busy. Crawl rates for different timeframes for a web site are determined based on the historical log data, and web crawlers are scheduled to crawl the web site according to the crawl rates to minimize the chances that web crawler requests are responsible for the site crashing.

20 Claims, 5 Drawing Sheets

(56) References Cited

OTHER PUBLICATIONS

Weiss, Aaron, "How to: Protect Your Website Using robots.txt, Part 1", Published Jan. 6, 2010, 4 pages (Retrieved Apr. 27, 2011), available at: http://www.esecurityplanet.com/trends/article.php/3856871/How-to-Protect-Your-Website-Using-robotstxt-Part-1.htm.

diTii.com, D'Technology Weblog, "Google Return 503 HTTP Result Code (Service Unavailable) to Avoid Negative Affect on Your Site's Visibility in the Search Results", Published Jan. 25, 2011, 7 pages (Retrieved Apr. 27, 2011), available at: http://www.ditii.com/2011/01/25/google-return-503-http-result-code-service-unavailable-to-avoid-negative-affect-on-your-sites-visibility-in-the-search-results/.

IBM Content Analytics, Version 2.2+, "Web Crawler Crawl Rate", last updated Oct. 2010, 1 page (Retrieved Apr. 27, 2011), available at: http://publib.boulder.ibm.com/infocenter/analytic/v2r2m0/index.jsp?topic=/com.ibm.discovery.es.ad.doc/iiysawrate.htm.

Get/Robots.TXT, "The Web Robots Pages", last updated Aug. 23, 2010, 1 page (Retrieved Apr. 27, 2011), http://www.robotstxt.org.

\* cited by examiner

OPTIMIZING WEB CRAWLING WITH USER HISTORY

BACKGROUND

Search engines use web crawlers to understand documents on the World Wide Web ("the web"). Web crawlers are programs that persistently search the web, indexing web sites by their content (e.g., keywords, text, reciprocal links, videos, images, audio, and the like). Because web sites are constantly changing, web crawlers must repeatedly crawl sites to index the freshest content. Repetitively accessing a web site poses problems for the site's owner, however, because servers hosting the site may only be able to service a particular number of users/requesters at the same time. So crawling the site during peak traffic periods (e.g., a site for trading stocks around the opening bell of a particular stock exchange) becomes dangerous for the stability of the site. Balancing the need to index fresh content with the temperamental nature of a site's traffic is a difficult task for modern web crawlers.

The traditional way site owners try to control the rate at which web crawlers access their sites is through an instructional text file called a "robot.txt" file. Robot.txt files indicate the rate web crawlers can access the site (the "crawl rate") and a delay the web crawler must wait between fetches (the "crawl delay"). Both the crawl rate and delay are pre-determined, static values that consequently do not allow for adjustment based on the site traffic.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect is directed to using log data sent from web browsers on client computing devices in the management and scheduling of web crawlers. The log data indicates users of the web browsers web history. Log data from many different clients are received and aggregated, and the aggregated data log data is analyzed to understand how busy the web site has historically been during different timeframes. Assuming the historical busyness of different timeframes is a decent predictor of the busyness of future timeframes during the same times, one embodiment uses the calculated business during the timeframes to probabilistically estimates traffic to the web site for future timeframes. The traffic estimates are used to determine rate for web crawlers to access and crawl the web site.

Another aspect is directed to aggregating log data periodically received from client web browsers with other received client-browser log data to understand the historical busyness of a web site during different timeframes. Using the aggregate log data, probabilistic estimates of traffic to the web site during one or more timeframes are formed, and web crawlers are set to fetch the web sites at a rate that will not exceed the traffic estimates. Doing so provides a high probability that the web crawlers will not crash the web site.

In yet another aspect, a server is configured to execute a politeness manager that manage web crawlers. The politeness manager estimates a threshold frequency of page requests for a web site during different timeframes based on log data sent by client web browsers indicating the history of those browsers. Based on the log data, the politeness manager schedules one or more web crawlers to access the web site at a rate less than the threshold frequency of page requests. The web crawlers access the web site according to the politeness manager's scheduling, cumulatively crawling at a rate less than the threshold frequency of page requests.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
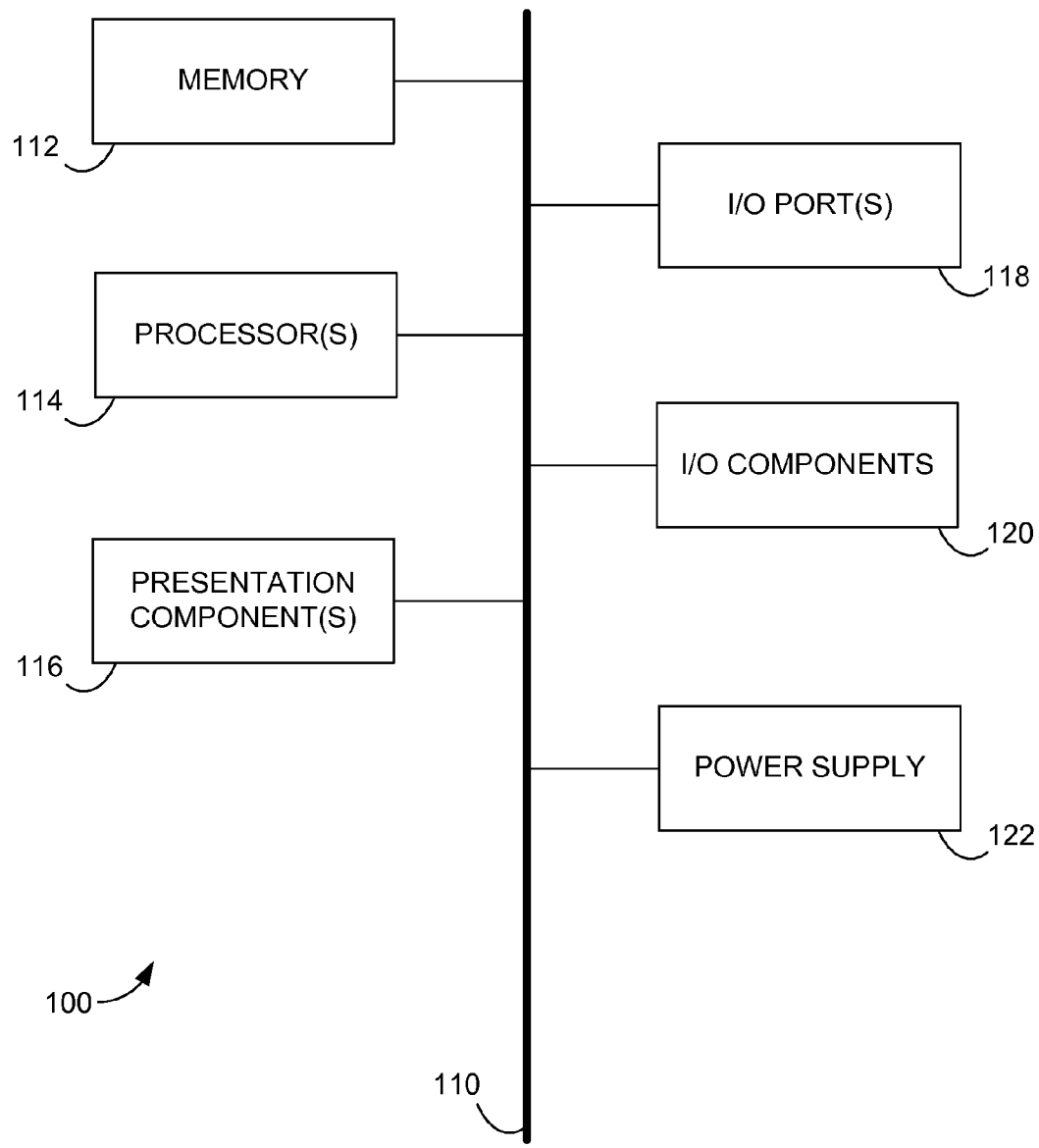
FIG. 1 is a block diagram of a computing device, according to one embodiment.

The subject matter described herein is presented with specificity to meet statutory requirements. The description herein is not intended, however, to limit the scope of this patent. Instead, the claimed subject matter may also be embodied in other ways, to include different steps or combinations of steps similar to the ones described in this document, in conjunction with other present or future technologies.

As used herein, "web sites" refer to web pages, web blogs, online video, online images, online video, and various other content that may be accessible over a network. To aid the readability of the description herein, "web site" and "site" are used interchangeably. One skilled in the art will appreciate that web crawlers can be configured to analyze and interpret text and/or metadata on a web site to understand online content. To that end, text may be judged or weighted based on the text's underlying definition, placement on the website, or position to another portion of content. A classic example of judging content is counting the number of times a keyword or phrase is on a web site, providing more deference when the keyword is at the top of the web site, in a title on the web site, or found relatively close to another instance of the keyword. Or, in another example, a video's title may be analyzed for keywords as well as placement on the web site. Countless ways exist for inferring and judging web site content by a web crawler, so different embodiments may use different techniques.

Generally speaking, embodiments described herein are directed to intelligently managing web crawlers accessing web sites. Different embodiments ascertain a rate at which to crawl a web site based on a sampling of historical log data from reporting web browsers on clients or from host servers providing webmaster services. Aggregating the log data allows some embodiments to understand which timeframes are particularly busy and which ones are not in order to increase or decrease the frequency web crawlers access the web site. When the site has historically not been busy, the web crawlers may be allowed to request the web site more frequently than when the site has historically been busy.

At least one embodiment uses log data sent from web browsers on client computing devices. The log data indicates users of the web browsers web history, which can aggregated with log data from other web browsers to understand traffic patterns to a particular web site. As an example, consider the web site www.microsoft.com. Log data from many different clients are received and aggregated. The aggregated log data is then analyzed to understand what times are typically busy for www.microsoft.com and what times are less busy. For example, the log data may reveal that www.microsoft.com is accessed far less frequently at midnight on a weekday than at lunch time. Understanding the busy and quiescent times allows the embodiment to probabilistically estimate traffic to the web site during different timeframes, such as between 1:00 am-2:00 am. The traffic estimate can then be used to determine a rate at which web crawlers can access the web site (the crawl rate), and the crawl rate used, in one embodiment, to schedule crawling of the web site.

Another embodiment receives log data indicating browser history from a web browser. The browser history may include such data as the uniform resource locators ("URLs") of the web sites historically visited by the browser, times and dates the URLs were visited, referrer URLs (i.e., the URL of a previously requested site), page signature, as well as other well-known attributes saved as a browser's history. The embodiment also has access to log data from other web browsers and aggregates all log data to form an intelligent picture of the traffic to a particular web site. Using the aggregated log data, probabilistic estimates of traffic to the web site during one or more timeframes is formed. For example, the aggregate log data may be analyzed to determine that the web site receives peak traffic from 12:14-12:42 pm.

Based on the traffic estimates across one or more timeframes, the embodiment determines a threshold frequency of requests that can be made to the web site during the timeframe without jeopardizing the site's stability. For example, the traffic estimate may dictate that, at most, twenty requests per second may be made during the timeframe, while another timeframe may handle thirty requests per second. One or more web crawlers can then be instructed to request the web site during the first time frame at less than twenty requests per second, or in some embodiments, considerably less than twenty requests per second to ensure that crawling does not bring down the site.

In yet another embodiment, a server is configured to execute a "politeness manager," which refers to computer-executable instructions (implemented either as software, firmware, hardware, or a combination thereof) that manage web crawlers. In this embodiment, the politeness manager estimates a threshold frequency of page requests for a web site during a different timeframes based on log data sent by client web browsers, indicating the history of those browsers. Based on the log data, the politeness manager schedules one or more web crawlers to access the web site at a rate less than the threshold frequency of page requests. The web crawlers—which are also implemented either as software, firmware, hardware, or a combination thereof—access the web site according to the politeness manager's scheduling. For example, the politeness manager may schedule ten web crawlers to access the web site at one page per second from 2:00-2:15 pm after determining that those fifteen minutes are historically busy justifying a less-frequent crawl rate of fifteen requests per second. As a result, the web crawlers cumulatively crawl at a rate of ten requests per second. Such an example is not meant to limit the discussed embodiment, as the example is provided purely for illustrative purposes.

Embodiments mentioned herein may take the form of a computer-program product that includes computer-useable instructions embodied on one or more computer-readable media. Computer-readable media include both volatile and nonvolatile media, removable and nonremovable media, and contemplates media readable by a database. The various computing devices, application servers, and database servers described herein each may contain different types of computer-readable media to store instructions and data. Additionally, these devices may also be configured with various applications and operating systems.

By way of example and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory devices can store data momentarily, temporarily, or permanently.

As used herein, "components" refer to a computer-related entity, either hardware, software (e.g., in execution), and/or firmware. Components may operate in a client-server relationship to carry out various techniques described herein. Such computing is commonly referred to as "in-the-cloud" computing. For example, a component may be a process running on a processor, a library, a subroutine, and/or a computer or a combination of software and hardware. By way of illustration, both an application running on a server and the server may be a component. One or more components can reside within a process, and a component can be localized on a computing device (such as a server) or distributed between two or more computing devices communicating across a network.

Referring initially to FIG. 1 in particular, an exemplary operating environment for implementing one embodiment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of illustrated component parts. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

Embodiments may be described in the general context of computer code or machine-useable instructions, including computer-executable instructions such as program modules, being executed by a computer or other machine, such as a PDA or other handheld device. Generally, machine-useable instructions define various software routines, programs, objects, components, data structures, remote procedure calls (RPCs), and the like. In operation, these instructions perform particular computational tasks, such as requesting and retrieving information stored on a remote computing device or server.

Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation devices 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various hardware is not so clear, and metaphorically, the lines would more accurately be grey and fuzzy. For example, one may consider a presentation device, such as a monitor, to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 may include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation device 116 presents data indications to a user or other device. Exemplary presentation components include a display device, speaker, printing component, vibrating component, etc.

Specifically, memory 112 may be embodied with instructions for a web browser application, such as Microsoft Internet Explorer®. One skilled in the art will understand the functionality of web browsers; therefore, web browsers need not be discussed at length herein. It should be noted, however, that the web browser embodied on memory 112 may be configured with various plug-ins (e.g., Microsoft SilverLight™ or Adobe Flash). Such plug-ins enable web browsers to execute various scripts or mark-up language in communicated web content. For example, a JavaScript may be embedded within a web page and executable on the client computing device 100 by a web browser plug-in.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
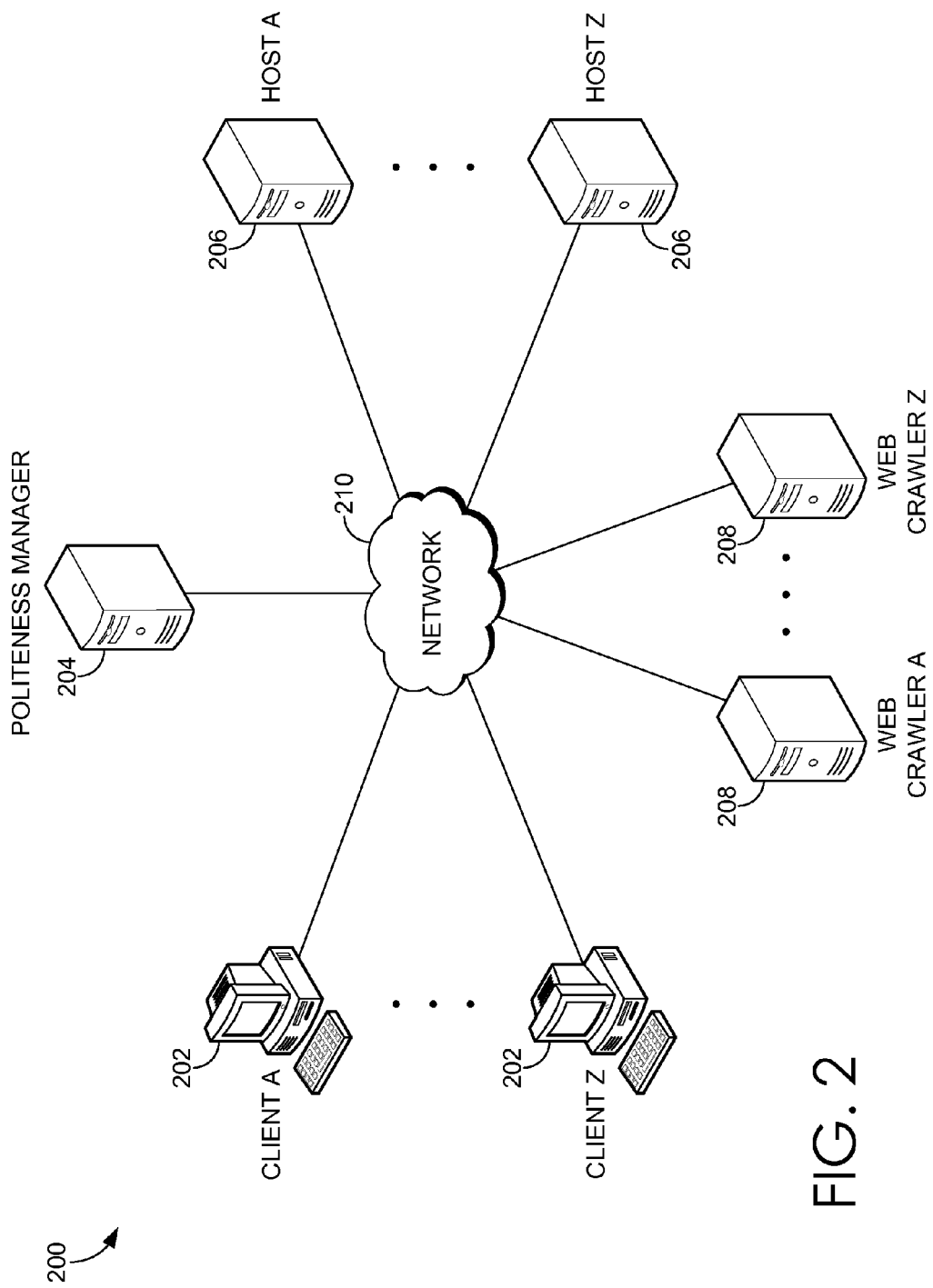
FIG. 2 is a block diagram of a networking environment for intelligently crawling a web site, according to one embodiment.

FIG. 2 is a block diagram of a networking environment 200 for intelligently crawling a web site, according to one embodiment. Networking environment 200 comprises several computing devices, including client computing devices A-Z (represented as "clients 202"), politeness manager 204, web-hosting servers A-Z (represented as "hosts 206"), and web crawler servers A-Z (represented as "web crawlers 208"). Clients 202, hosts 206, and web crawlers 208 may each include one or more computing devices, hence the reason each is shown with dots to signify scalability.

While clients 202, politeness manager 204, hosts 206, and web crawlers 208 are discussed below as being executed by separate computing devices, some embodiments may include a combination of such devices on the same computing device. For example, politeness manager 204 may be executed by the same server executing the web crawlers 208, or hosts 206 may be housed in the same server as the politeness manager 204. In other words, different computing devices (clients and servers) and combinations thereof may be used by the embodiments discussed herein.

The computing devices in network environment 200 communicate with each other across network 210, which may include any communicative network, such as the Internet, a private network, local area network (LAN), wide area network (WAN), or the like. Network 210 may comprise a LAN networking environment that includes components connected through a network interface or adapter. In an embodiment where network 210 provides a WAN networking environment, components may use a modem to establish communications over the WAN. Network 210 is not limited, however, to connections coupling separate computer units; instead, network 210 may also include subsystems that transfer data between a server and the computing devices. For example, network 210 may include a point-to-point connection. One skilled in the art will appreciate that various computer networks may be used, and thus do not need to be discussed at length herein.

Clients 202 may be any type of computing device, such as the device 100 described above with reference to FIG. 1. By example, without limitation, clients 202 may each be a personal computer, desktop computer, laptop computer, handheld device, mobile phone, electronic tablet, or other personal computing device. Clients 202 may each be configured with a web browser capable of rendering web sites by submitting a URL or uniform resource identifier ("URI").

In one embodiment, the web browser residing on the clients 202 comes equipped with a toolbar or other plug-in (the "plug-in") that is configured to periodically transmit log data to the politeness manager 204. The log data may include various historical parameters saved by a web browser, detailing the web browser's web history. Examples of such historical parameters include, without limitation, URLs or URIs visited by the web browser along with time and/or date stamp of when an underlying web site was visited, referrer web sites previously visited before a specific site visit, internet protocol ("IP") address of a web site being visited, signature page of a web site, or the like. The plug-in allows periodically transmits the historical parameters, and may do so by way of an HTTP URL message. For instance, the web browser may send HTTP URL messages every day, twelve hours, hour, or other time span.

Hosts 206 host a web site and allow requesting web browsers to access the site. Various intricacies for hosting a web site will be known to those skilled in the art, so they do not need to be discussed at length herein. Although, some embodiments will incorporate hosts 206 that provide various webmaster and analytic servlets or applications that can be used to manage the web site. These servlets or applications, in one embodiment, create log data detailing all clients 202 that have visited the site. This server-created log data may include such historical parameters as those generated by the plug-in of the web browsers on clients 202.

Politeness manager 204 represents software, firmware, hardware, or a combination thereof, hosted on a computing device like a server. In one embodiment, politeness manager 204 accesses and analyzes log data from the clients 202 to determine trends in user traffic to a web site on hosts 206. To do so, politeness manager may aggregate the log data in the HTTP URL messages submitted by the numerous browsers, noting when and how frequently users visit the web site. Politeness manager eventually determines the historical traffic patterns to a web site during different timeframes. The timeframes may be across any measure of time of during a particular event: for example, a specific hour, collection of minutes of a day; a specific day (e.g., Saturday, Monday, etc.); after a specific event (e.g., opening bell of a stock exchange); or a combination thereof.

In other embodiment, politeness manager also accesses log data from web-hosting, analytic, or webmaster applications. For example, a host 206 may provide various services for supporting the web site. In exchange or those services, or perhaps as one of them, hosts 206 may store log data to the web site, thus painting a very accurate picture of the traffic to the site. Whereas, the log data from the web browsers on the clients 202 may only capture data from users who have installed the plug-in. Other embodiments may use a combination of the two types of log data to determine site traffic.

Politeness manager 204 also schedules web crawlers 208 to crawl the web site on hosts 206. Web crawlers 208 represent software applications capable of requesting a web site and analyzing the site's content. One skilled in the art will appreciate that various probabilistic calculations may be performed by the web crawlers 208 after content is received. For example, two instances of a keyword may be weighted in a certain manner based on how close they are together in on the site or how close they are to the top of a page on the site. Numerous weighting and analysis techniques exist for understanding and indexing a web site that will generally be understood by one skilled in the art.

In operation, politeness manager 204 may schedule web crawlers 208 to crawl a web page at a certain crawl rate or crawl delay, and both may be calculated based on an estimate of future traffic data. The estimate of future traffic data is calculated, in one embodiment, after the politeness manager 204 analyzes the log data that details historical traffic to the site. The historical traffic indicates to the politeness manager 204 what timeframes are historically busy for the site (i.e., when the site is requested more frequently) and what timeframes are historically slower (i.e., fewer requests of the site). Using the historical traffic data, the politeness manager determines a pretty accurate estimate of future site traffic from which to figure the crawl rate. The crawl rate, in one embodiment, is calculated to be an average of traffic visits during a particular timeframe. For example, the average number of visitors to the web site between 2:00 pm and 2:15 pm GST over the last 200 days may be used to estimate what the traffic will be in the during that timeframe in the future.

The politeness manager 204 may schedule web crawlers to access the web site during the timeframe at a frequency less than the estimated number of site visitors. If thirty queries per second are received at the site during a timeframe, for example, the politeness manager may schedule web crawlers 208 to crawl the site at twenty-nine or fewer queries per second. In such an embodiment, the politeness manager 204 schedules the web crawlers 208 to crawl at a rate less than the estimated threshold number of page requests calculated for the site. In one embodiment, politeness manager 204 may request confirmation from either the site owner or hosts 206 to crawl at the determined crawl rate.

If a site crashes or experiences other problems while the web crawlers 208 are crawling, one embodiment halts the web crawlers 208 from requesting the web site. For instance, an HTTP 503 error may be received by one of the web crawlers 208, triggering the web crawlers 208 to stop. Web crawlers 208 may be mindful of other errors as well.

Figure 3:
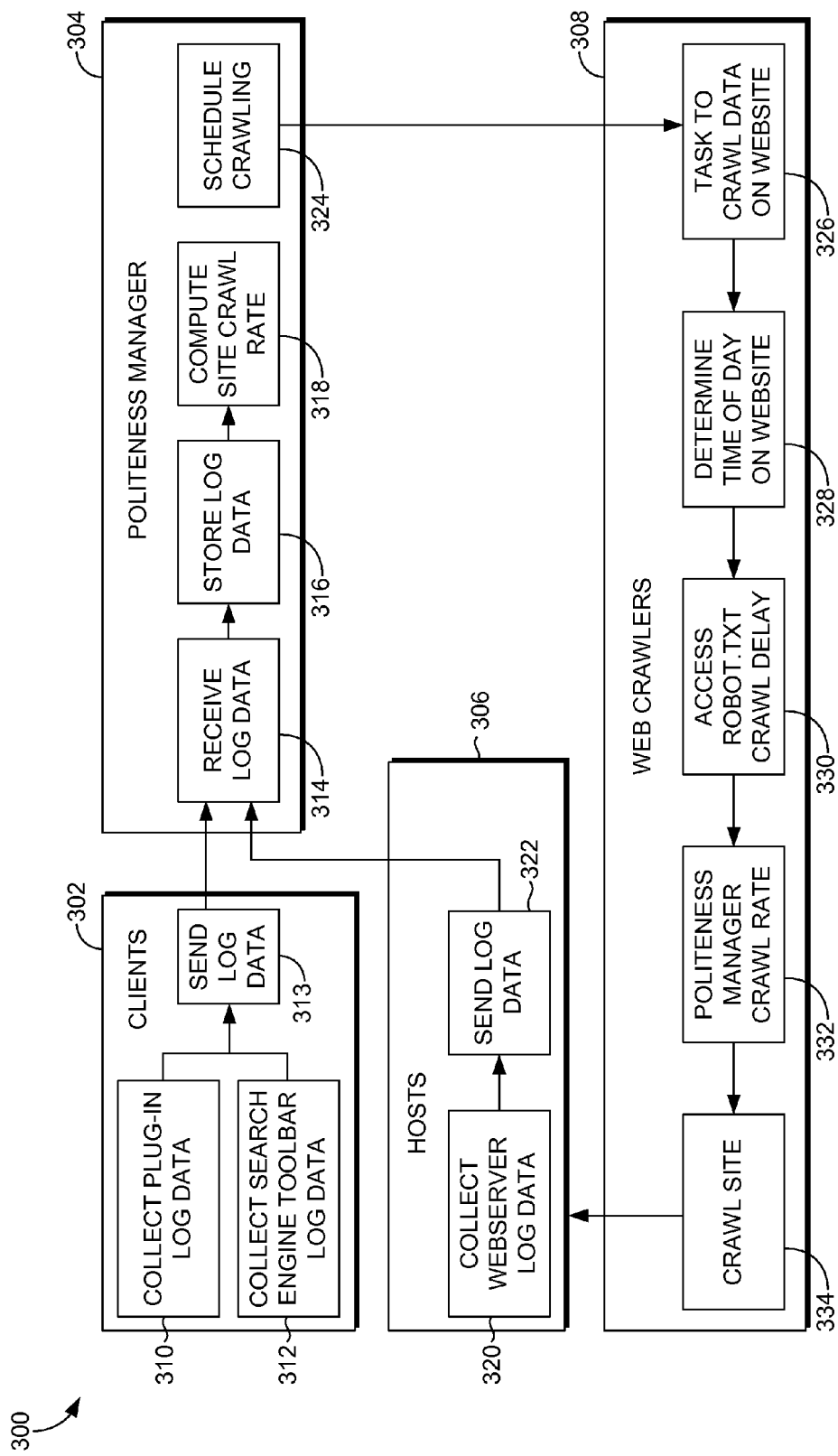
FIG. 3 is a diagram of a processing flow with several devices working to intelligently crawl a web site, according to one embodiment.

FIG. 3 is a diagram of a processing flow 300 with several devices working to intelligently crawl a web site, according to one embodiment. Flow 300 shows various flows between clients 302, politeness manager 304, web site hosts 306 ("hosts 306)"), and web crawlers 308—all of which communicate across a network (not shown for clarity).

Beginning in the upper left of flow 300, clients 302 collect log data from a web browser plug-in and/or toolbar, as shown at 310 and 312. As shown at 313, clients 202 send the log data to the politeness manager, which receives and stores the log data (shown at 314 and 316) and computes a crawl rate for the web site (shown at 318). Again, the crawl rate may be set so the web crawlers 308 request the web site at frequency less than a determined number of requests of the site during a particular timeframe. Politeness manager 304 may modify (increase or decrease) the crawl rate from one timeframe to another. For example, a peak timeframe justify a crawl rate that schedules the web crawlers 308 to request the web site less frequently than during a non-peak timeframe.

In addition or in the alternative to clients 302's log data, hosts 306 may collect and send log data gathered by analytic or webserver tool (as shown at 320 and 322). This server-side log data may be used in conjunction, or in lieu, of the clients 302's log data to determine the crawl rate.

In one embodiment, as shown at 324, politeness manager 304 schedules the web crawlers 308 during a timeframe based on the determined crawl rate or a threshold frequency of site requests during the timeframe. Crawling the web site may begin by initially tasking one or more of the web crawlers to crawl data on the web site, as shown at 326. The web crawlers may determine what day and time of day it presently is, as shown at 328. Also, some embodiments will make the web crawlers 308 retrieve and adhere to a crawl rate and/or crawl delay in a robot.txt file, should one exist, as shown at 330. Alternatively or in addition, the web crawlers access and adhere to the crawl rate specified by the politeness manager— i.e., the crawl rate determined based on the received log data (client and/or host)—as shown at 332. As shown at 334, the web crawlers 308 begin crawling the web site on hosts 306, adhering to the crawl rate determined by the politeness manager, and in some embodiments, minding the robot.txt file crawl rate and crawl delay.

Figure 4:
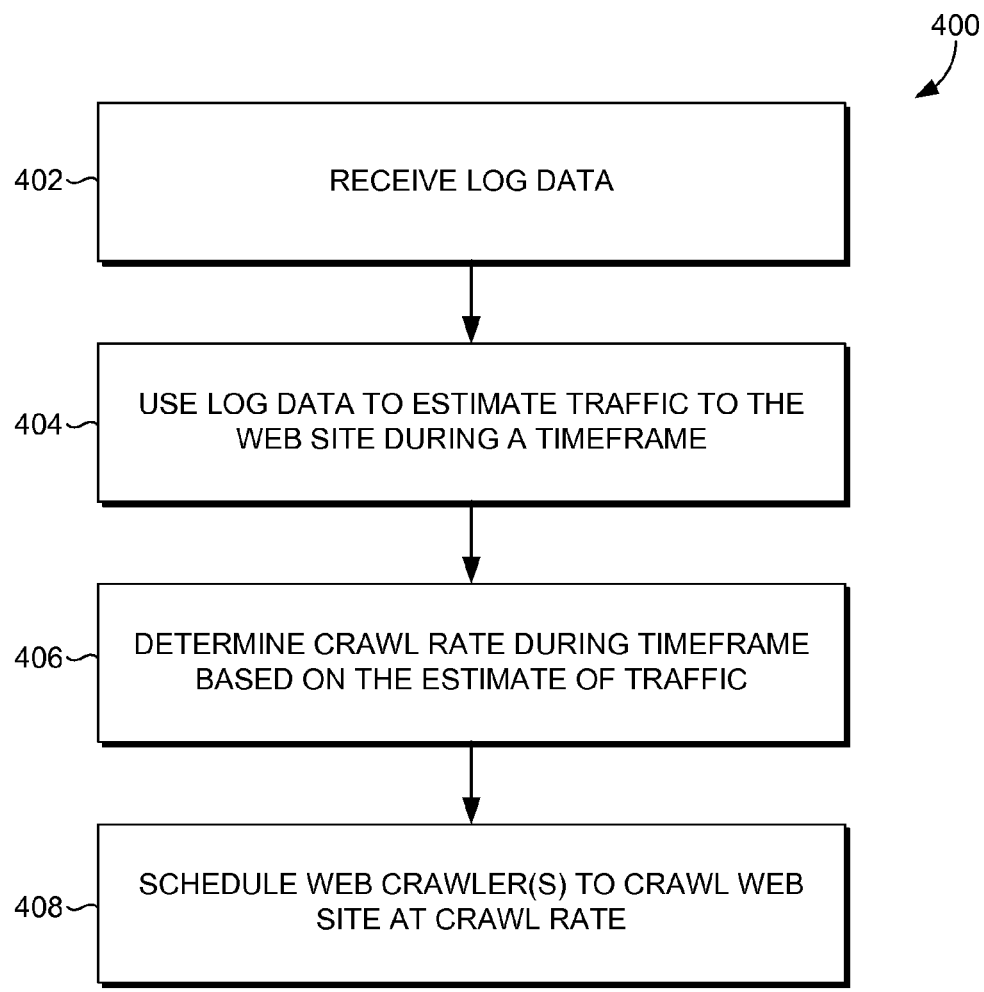
FIG. 4 is a diagram of a flowchart for intelligently crawling a web site, according to one embodiment.

FIG. 4 is a diagram of a flow 400 for intelligently crawling a web site, according to one embodiment. Flow 400 includes step 402 of receiving log data from a plurality of web browsers. The log data may come from client computing devices (e.g., by way of the client's web browsers periodically sending the log data), or in another embodiment, may come from a server providing various webmaster analytic tools for the web site (e.g., from a server capturing all relevant history to the web site). Step 404 includes using the log data to estimate traffic to the web site during a timeframe, such as during a particular set of days, seconds, hours, minutes, seconds, or some combination. Step 406 includes determining a crawl rate during the timeframe based on the estimate of traffic. In one embodiment, the crawl rate (i.e., the rate at which web crawlers cumulatively can access a web site) is set to ensure that the crawlers do not access the web site more than the historical average of page requests during the timeframe. With the crawl rate determined, a server or politeness manager (as mentioned above) in one embodiment schedules one or more web crawlers—or instances of web crawlers—to begin accessing the web site according to the crawl rate during the timeframe, as shown at step 408.

Although not shown, a later timeframe may justify a different crawl rate during which the server or politeness manager may schedule the web crawlers to access the web site at a different rate. To this end, the server or politeness manager may dynamically change the scheduling of web crawlers to account for differing crawl rates during different times.

Figure 5:
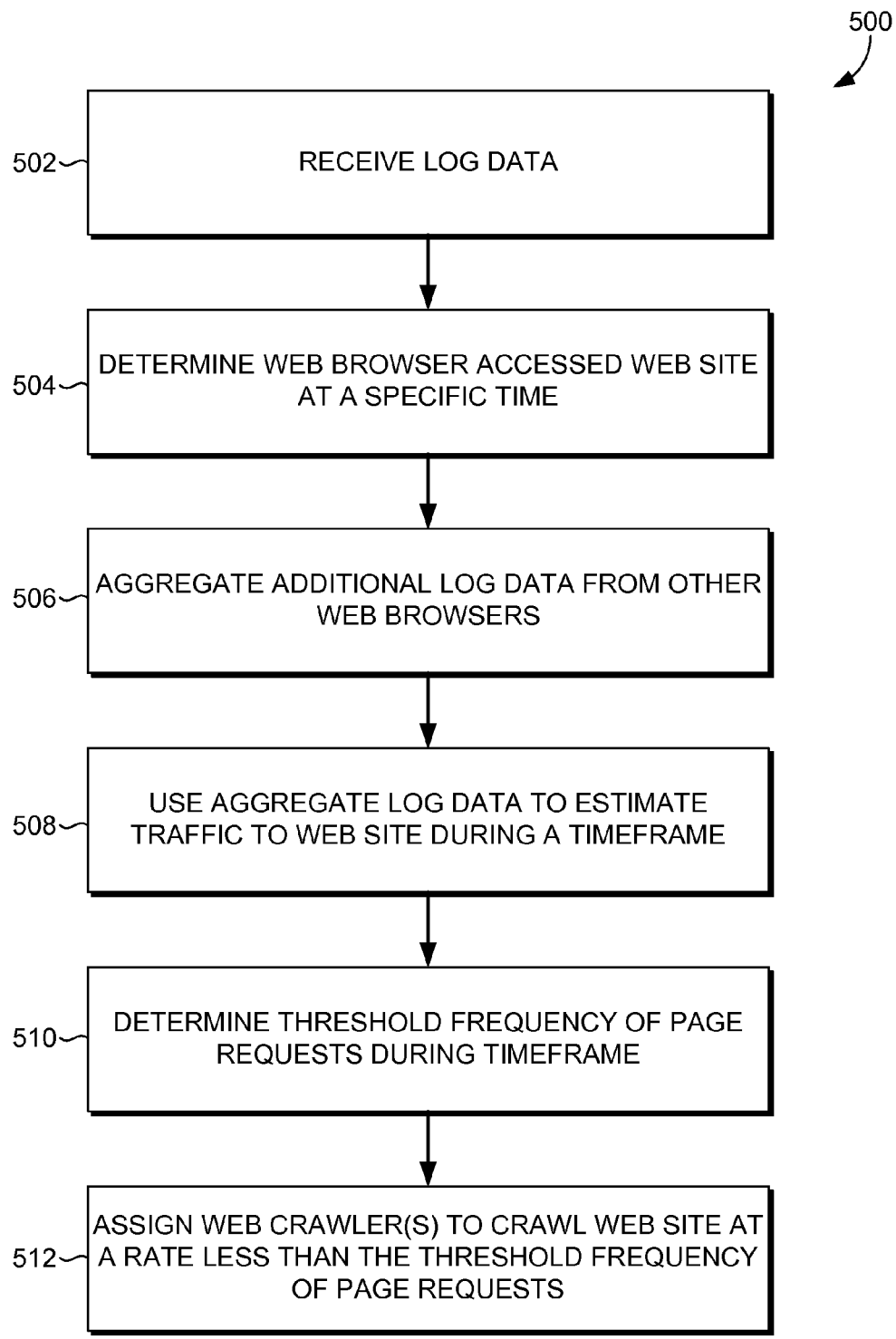
FIG. 5 is a diagram of a flowchart for intelligently crawling a web site, according to one embodiment.

FIG. 5 is a diagram of a flowchart for intelligently crawling a web site, according to one embodiment. Flow 500 includes step 502 of receiving log data from a web browser indicating historical browsing history. The log data may come from client computing devices (e.g., by way of the client's web browsers periodically sending the log data), or in another embodiment, may come from a server providing various webmaster analytic tools for the website (e.g., from a server capturing all relevant history to the web site). Step 504 includes determining that the web browser accessed the web site at a specific time, and step 506 goes on to aggregate additional log data from a plurality of other web browsers. The additional log data indicates additional historical browsing history of other web browsers accessing the web site. As shown in step 508, the log data and additional log data are used to estimate traffic to the web site during a timeframe. During the timeframe, step 510 determines a threshold frequency of page requests for the web site, and step 512 assigns one or more web crawlers to crawl or access the web site at a rate less than the threshold frequency of page requests.

Although not shown, a later timeframe may justify a different frequency of page requests during which web crawlers are assigned to access the web site more or less frequently. To this end, a server or politeness manager may dynamically change the scheduling of web crawlers to account for differing access frequencies at during different times.

The illustrated steps are not limited to a sequential manner, as some embodiments will perform the steps in parallel or out of the sequence illustrated. Furthermore, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. A method for crawling a web site, comprising:
   receiving, at a server device, log data from a plurality of web browsers, the log data indicating users accessing the web site through the web browsers;
   using, at the service device, the log data to estimate traffic to the web site during a timeframe;
   determining, by the server device, a threshold frequency of page requests for the web site during the timeframe based on the estimate of traffic;
   determining, at the server device, a crawl rate during the timeframe that is less than the threshold frequency of page requests; and
   using the crawl rate to schedule one or more web crawlers to request the web site.

2. The method of claim 1, wherein the log data indicates a plurality of uniform resource locators ("URLs") historically accessed by the plurality of web browsers.

3. The method of claim 2, wherein the log data indicates times and dates that the plurality of web browsers accessed the plurality of URLS.

4. The method of claim 2, wherein the log data indicates a plurality of referral URLs users accessed before the URLs.

5. The method of claim 1, further comprising determining one or more peak and non-peak timeframes for accessing the web site based on the estimate of traffic to the web site, wherein the peak timeframe is a time that the web site historically experiences more traffic than the non-peak timeframe.

6. The method of claim 5, further comprising scheduling the one or more web crawlers to access the web site more frequently during the peak timeframe than during the non-peak timeframe.

7. The method of claim 5, further comprising scheduling the one or more web crawlers to not access the web site during the peak timeframe.

8. The method of claim 1, wherein the one or more web crawlers, upon accessing the web site, analyze content on the web site to index the web site.

9. The method of claim 1, further comprising:
   receiving analytics logs from one or more analytics applications that monitor access to the web site; and
   using the webmaster data to specify the crawl rate during the timeframe.

10. The method of claim 1, wherein the log data is received in an HTTP URL message.

11. The method of claim 1, further comprising:
    receiving an HTTP error; and
    based on receiving the HTTP error, stopping the one or more web crawlers from requesting the web site.

12. The method of claim 1, wherein the crawl rate indicates a maximum frequency for accessing the web site.

13. One or more computer-storage media embodied with computer-executable instructions that, when executed by a processor, coordinate web crawling of a web site, comprising:
    receiving log data from a web browser indicating historical browsing history;
    determining that the web browser accessed the web site at a specific time;
    aggregating additional log data from a plurality of other web browsers, the additional log data indicating additional historical browsing history of the other web browsers accessing the web site;
    using the log data and the additional log data to estimate traffic to the web site during a timeframe;
    determining a threshold frequency of page requests for the web site during the timeframe based on the estimate of traffic; and
    assigning one or more web crawlers to access the web site at a rate less than the threshold frequency of page requests.

14. The media of claim 13, further comprising:
    determining a second estimate of traffic to the web site during a second timeframe based on the log data and the additional log data; and
    based on the second estimate of traffic indicating less historical traffic to the web site during the second timeframe than the estimate of traffic, scheduling the one or more crawlers to access the web site more frequently during the second timeframe than the timeframe.

15. The media of claim 13, further comprising:
    determining a second estimate of traffic to the web site during a second timeframe based on the log data and the additional log data; and based on the second estimate of traffic indicating more historical traffic to the web site during the second timeframe than the estimate of traffic, scheduling the one or more crawlers to access the web site less frequently during the second timeframe than the timeframe.

16. The media of claim 13, wherein the threshold frequency of page requests for the web site comprises a number of requests per a specific quantity of time.

17. The media of claim 13, further comprising transmitting a notification comprising:
   one or more peak timeframes for crawling the web site based on the historical browsing history and the additional historical browsing history,
   non-peak timeframes for crawling the web site based on the historical browsing history and the additional historical browsing history, and
   a request for approval for crawling the web site at one or more rates during either the peak or non-peak timeframes.

18. A server, comprising:
   one or more processors executing a politeness manager to (204 and 304):
   (1) estimate a threshold frequency of page requests for a web site during a first and second timeframe based on historical log data indicating a plurality of users accessing the web site, and
   (2) schedule one or more web crawlers to access the web site less than the threshold frequency of page requests; and
   one or more web crawlers accessing the web site as scheduled by the politeness manager.

19. The server of claim 18, the threshold frequency of page requests is also based on historical analytics logs from one or more analytics applications that monitor access to the web site.

20. The server of claim 18, wherein the politeness manager further transmits a request to crawl the web site at a rate less than the threshold frequency of page requests.

* * * * *